J. B. SMITH.
AUTOMATIC CUT-OFF GAS BURNER.
No. 74,440. Patented Feb. 11, 1868.
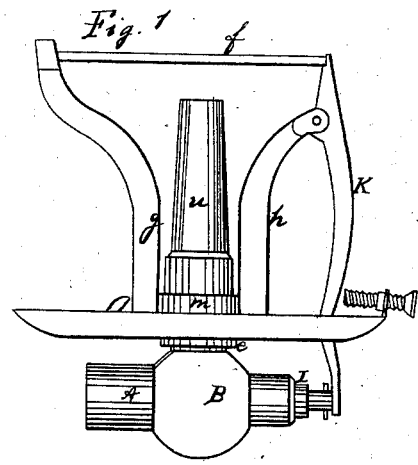
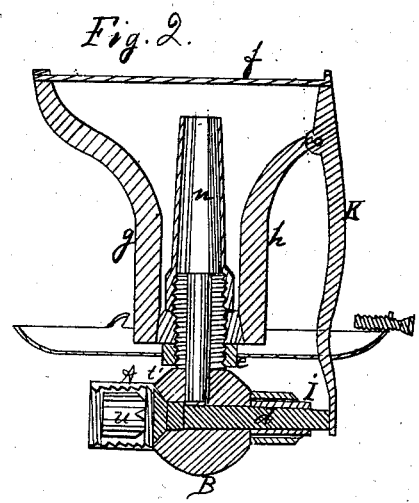
Witnesses.
Inventor.

United States Patent Office.

JOHN B. SMITH, OF PITTSTON, PENNSYLVANIA.

Letters Patent No. 74,440, dated February 11, 1868.

IMPROVEMENT IN AUTOMATIC CUT-OFF GAS-BURNERS.

The Schedule referred to in these Letters Patent and making part of the same.

TO ALL WHOM IT MAY CONCERN:

Be it known that I, JOHN B. SMITH, of Pittston, in the county of Luzerne, and State of Pennsylvania, have invented certain new and useful Improvements in Automatic Gas Cut-Off Burners; and I do hereby declare that the following is a full, clear, and exact description thereof, reference being had to the accompanying drawings, and to the letters of reference marked thereon, which form a part of this specification.

Figure 1, in the annexed drawings, represents a side elevation of my automatic cut-off gas-burner, and
Figure 2 is a vertical section of the same.

The nature of this invention consists, first, in the employment of a metal rod, so arranged in connection with other devices hereinafter described as to automatically shut off the flow of gas when the flame is blown out; and, second, in the employment of an adjustable screw, inside of the pipe, for regulating the flow of gas, substantially as hereinafter set forth.

A represents a short metal pipe, with the bulb B in the centre. Into one end of said pipe a female screw is cut for the purpose of attaching it to a common gas-pipe. In this pipe is screwed the adjusting-screw $w$, which is designed to regulate the flow of gas by allowing the stem $d$ more or less play. The bulb B is made hollow, and is furnished at top with the shoulder $e$, on which is designed to rest the common fixture for supporting a glass globe. $g$ and $h$ represent two arms, connected at bottom with the circular nut $m$. $n$ designates a gas-burner, which screws through nut $m$, through shoulder $e$, and into bulb B, (see fig. 2.) $d$ represents a stem, which passes through the pipe A and bulb B as far as the point $t$, where it takes the form of the valve $s$, and shuts off the gas when required. Near the opposite end of stem $d$ is adjusted the cylindrical rubber or metal spring I, which extends inward to the circumference of bulb B. K represents a lever, having its fulcrum at the top of arm $h$. The short arm of lever K and the top of arm $g$ are connected together by the iron rod $f$, which may be made of steel, iron, or any other expansive material, the said rod being riveted to the upper end of arm $h$, and resting at the other end on a shoulder in K. Lever K extends down below the stem $d$, and is designed to act upon said stem, as hereinafter described. It will be observed that when the valve $s$ is in the position represented by fig. 2, it fits a circular cavity inside of pipe A, and opposite the point $t$, and thus prevents the gas from entering through bulb B into burner $u$. It becomes necessary, then, in order to admit the gas into the burner $u$, to press against the lower end of lever K with the thumb, and by this operation force the valve $s$ beyond the point $t$, where the bore of the pipe is sufficiently enlarged to allow the gas to pass around the circumference of valve $s$ into the bulb B and burner $u$. It will be necessary, after the gas is lit, to continue the pressure on stem $d$ for a few seconds, until the rod becomes heated, and by its expansion forces out the short arm of lever K, and causes the long arm of said lever to press against the stem $d$, and thus keep the valve $s$ in position to admit the constant flow of gas to the burner. On the other hand, should the gas be blown out, as it sometimes happens, the rod will in a few seconds contract sufficiently to draw in the short arm of lever K, and the pressure of the long arm being removed from the end of stem $d$, the spring I will act on stem $d$ and valve $s$, so as to close the opening through which the gas was admitted into the burner $u$, and thus automatically cut off the flow of gas; or, if the gas should only be partially turned off, so that the flame will not impinge rod $f$, a like result will also follow.

Having thus described my invention, what I claim, and desire to secure by Letters Patent, is—

1. The rod $f$, so arranged as to automatically cut off the flow of gas, substantially in the manner herein set forth.

2. In combination with the above, I claim lever K, substantially as and for the purpose set forth.

3. Stem $d$, in combination with lever K, substantially in the manner specified.

4. I claim pipe A, provided with bulb B, or any equivalent device, in combination with stem $d$, lever K, and rod $f$, substantially as and for the purpose described.

In testimony that I claim the foregoing as my own, I affix my signature, in presence of two witnesses.

JOHN B. SMITH.

Witnesses:
T. H. ALEXANDER,
C. ALEXANDER.